(12) United States Patent
Chen et al.

(10) Patent No.: US 8,411,443 B2
(45) Date of Patent: Apr. 2, 2013

(54) SLIDINGLY-ENGAGED HEAT-DISSIPATING ASSEMBLY FOR MEMORY AND MEMORY DEVICE HAVING THE SAME (75) Inventors: Wei-Hau Chen, New Taipei (TW); Tien-Chen Huang, New Taipei (TW); Cheng-Hsien Kuo, New Taipei (TW); Hsiao-Jung Lin, New Taipei (TW)

(73) Assignee: Comptake Technology Inc., New Taipei (TW)

( * ) Notice: Subject to any disclaimer, the term of this patent is extended or adjusted under 35 U.S.C. 154(b) by 330 days.

(21) Appl. No.: 13/011,283

(22) Filed: Jan. 21, 2011

(65) Prior Publication Data
US 2012/0188707 A1 Jul. 26, 2012

(51) Int. Cl.
*H05K 7/20* (2006.01)
(52) U.S. Cl. ....... 361/719; 361/704; 361/720; 165/80.3; 165/185
(58) Field of Classification Search ........................ None
See application file for complete search history.

(56) References Cited

U.S. PATENT DOCUMENTS

| | | | | |
|---|---|---|---|---|
| 7,032,650 B1* | 4/2006 | Tian | | 165/80.3 |
| 7,221,569 B2* | 5/2007 | Tsai | | 361/704 |
| 7,457,122 B2* | 11/2008 | Lai et al. | | 361/704 |
| 7,532,477 B2* | 5/2009 | Hsu | | 361/704 |
| 2003/0026076 A1* | 2/2003 | Wei | | 361/704 |
| 2008/0101035 A1* | 5/2008 | Chen | | 361/720 |
| 2010/0276134 A1* | 11/2010 | Lee | | 165/185 |
| 2011/0002103 A1* | 1/2011 | Lee | | 361/704 |

* cited by examiner

Primary Examiner — Boris Chervinsky
(74) Attorney, Agent, or Firm — Chun-Ming Shih; HDLS IPR Services (57) ABSTRACT A heat-dissipating assembly includes a first heat-dissipating body and a second heat-dissipating body adhered to two sides of the memory. The bottom edge of the first heat-dissipating body has a first supporting piece and first engaging pieces comprising a first stopping section and a first insertion section. The bottom edge of the second heat-dissipating body has a second supporting piece and second engaging pieces comprising a second stopping section and a second insertion section. The second insertion section extends toward the first insertion section. The first insertion section is slidingly disposed inside the second stopping section. The second insertion is slidingly disposed inside the first stopping section. The first stopping section abuts against the second stopping section, so that the first engaging piece and the second engaging piece are slidingly engaged with each other.

10 Claims, 8 Drawing Sheets

SLIDINGLY-ENGAGED HEAT-DISSIPATING ASSEMBLY FOR MEMORY AND MEMORY DEVICE HAVING THE SAME

BACKGROUND OF THE INVENTION

1. Field of the Invention

The present invention relates to a heat-dissipating assembly, and in particular to a heat-dissipating assembly for a memory.

2. Description of Prior Art

With the rapid advancement of science and technology, computer hardware is being developed to have a high operating speed and high frequency to thereby enhance its performance. As a result, the amount of electricity consumed by the computer hardware per second becomes much larger. Thus, the amount of heat generated by the existing electronic elements is relatively larger than before. For example, the operating clock and transmission bandwidth of a memory module becomes larger and larger in order to match a high-speed processor. As a result, the working temperature of the memory module and the amount of heat generated thereby are increased to such a level that the performance of the memory module is deteriorated. Even, the memory module may suffer damage.

Figure 1:
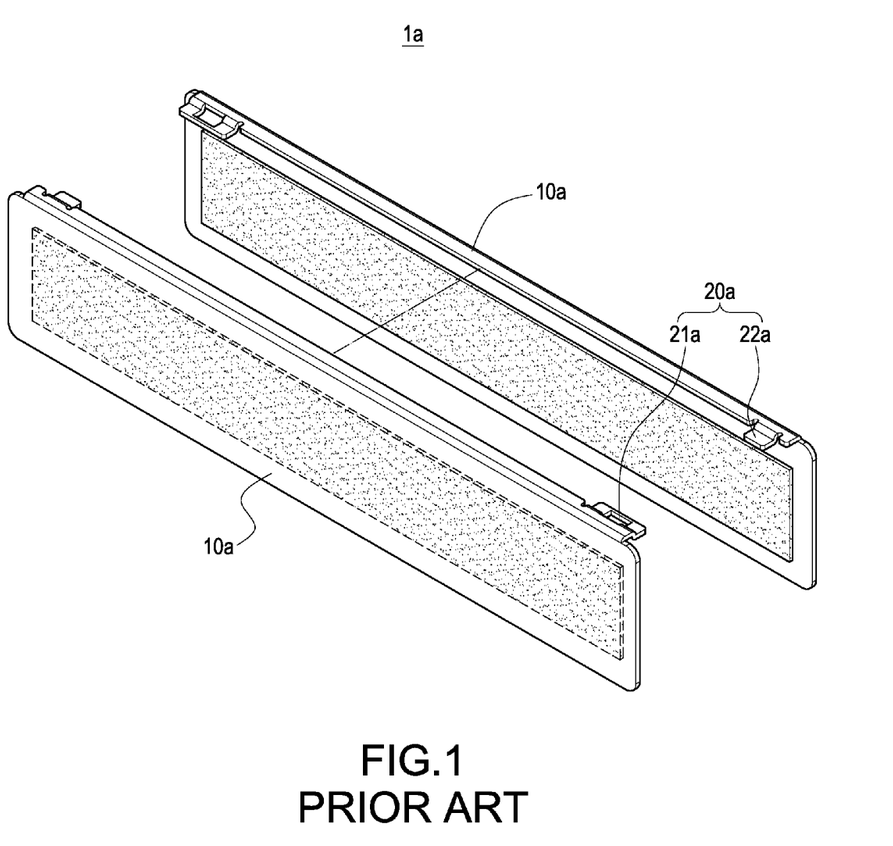
FIG. 1 is a conventional heat-dissipating device for a memory module.

FIG. 1 shows a conventional heat-dissipating device for a memory module. The heat-dissipating device 1a comprises two heat-dissipating pieces 10a. The two heat-dissipating pieces 10a face each other to sandwich the surfaces of the memory module. By this structure, the heat generated by the memory module can be dissipated by the two heat-dissipating pieces 10a. Each of the two heat-dissipating pieces 10a is formed with a fastening mechanism 20a. The fastening mechanism 20a comprises a hook 21a and a locking trough 22a corresponding to the hook 21a. The two heat-dissipating pieces 10a are engaged with each other by means of the fastening mechanism 20a/

In order to assemble the heat-dissipating device 1a, the hook 21a provided in one of the heat-dissipating pieces 10a is engaged in the locking trough 22a provided in another heat-dissipating piece 10a, whereby the two heat-dissipating pieces 10a can be engaged with each other. Then, the two heat-dissipating pieces 10a spread outwards to allow a memory to be disposed therebetween. Since the two heat-dissipating pieces 10a are engaged with each other by means of the engagement between the hooks 21a and the locking troughs 22a in a vertical direction, the hooks 21a may be separated from the locking troughs 22a in the vertical direction when the two heat-dissipating pieces 10a spread outwards. As a result, the two heat-dissipating pieces 10a need to be assembled again, and thus the assembly thereof requires more time and work.

In order to solve the above-mentioned problems, the present Inventor proposes a novel and reasonable structure based on his expert knowledge and delicate researches.

SUMMARY OF THE INVENTION

The present invention relates to a slidingly-engaged heat-dissipating assembly for a memory, which can be easily aligned and assembled with better engagement.

The present invention provides a slidingly-engaged heat-dissipating assembly for a memory, which includes a first heat-dissipating body and a second heat-dissipating body. The first heat-dissipating body is adhered to one side of the memory. A bottom edge of the first heat-dissipating body has a first supporting piece bent toward the memory. The first supporting piece has a pair of first engaging pieces. Each of the first engaging pieces comprises a first stopping section extending outwards from the first supporting piece and a first insertion section perpendicular to the first stopping section. The second heat-dissipating body is adhered to the other side of the memory to correspond to the first heat-dissipating body. A bottom edge of the second heat-dissipating body has a second supporting piece bent toward the memory. The second supporting piece has a pair of second engaging pieces. Each of the second engaging pieces comprises a second stopping section extending outwards from the second supporting piece and a second insertion section perpendicular to the second stopping section. The second insertion section extends toward the first insertion section. The first insertion section is slidingly disposed inside the second stopping section. The second insertion is slidingly disposed inside the first stopping section. The first stopping section abuts against the second stopping section, so that the first engaging piece and the second engaging piece are slidingly engaged with each other.

The present invention further provides a memory device having a slidingly-engaged heat-dissipating assembly, which can be aligned and assembled easily with better engagement.

The present invention provides a memory device having a slidingly-engaged heat-dissipating assembly, which includes a memory, a first heat-dissipating body and a second heat-dissipating body. The first heat-dissipating body is adhered to one side of the memory. A bottom edge of the first heat-dissipating body has a first supporting piece bent toward the memory. The first supporting piece has a pair of first engaging pieces. Each of the first engaging pieces comprises a first stopping section extending outwards from the first supporting piece and a first insertion section perpendicular to the first stopping section. The second heat-dissipating body is adhered to the other side of the memory to correspond to the first heat-dissipating body. A bottom edge of the second heat-dissipating body has a second supporting piece bent toward the memory. The second supporting piece has a pair of second engaging pieces. Each of the second engaging pieces comprises a second stopping section extending outwards from the second supporting piece and a second insertion section perpendicular to the second stopping section. The second insertion section extends toward the first insertion section. The first insertion section is slidingly disposed inside the second stopping section. The second insertion is slidingly disposed inside the first stopping section. The first stopping section abuts against the second stopping section, so that the first engaging piece and the second engaging piece are slidingly engaged with each other.

In comparison with prior art, the present invention has the following advantageous features. In the slidingly-engaged heat-dissipating assembly of the present invention, the bottom edge of each of the two heat-dissipating bodies is formed with a L-shaped engaging piece. The two engaging pieces are slidingly engaged with each other to combine the two heat-dissipating bodies. Since the two engaging pieces are aligned with each other in the front-and-rear direction, the two engaging pieces does not disengaged from each other easily even through the heat-dissipating bodies spread outwards. Thus, the slidingly-engaged heat-dissipating assembly for a memory of the present invention can be easily aligned with each other with better engagement. In assembly, a user can hold the two engaged heat-dissipating bodies by one hand and puts the memory between the two heat-dissipating bodies by another hand. Thus, the present invention can be assembled easily. Therefore, the present invention indeed demonstrates practicability and convenience.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 2:
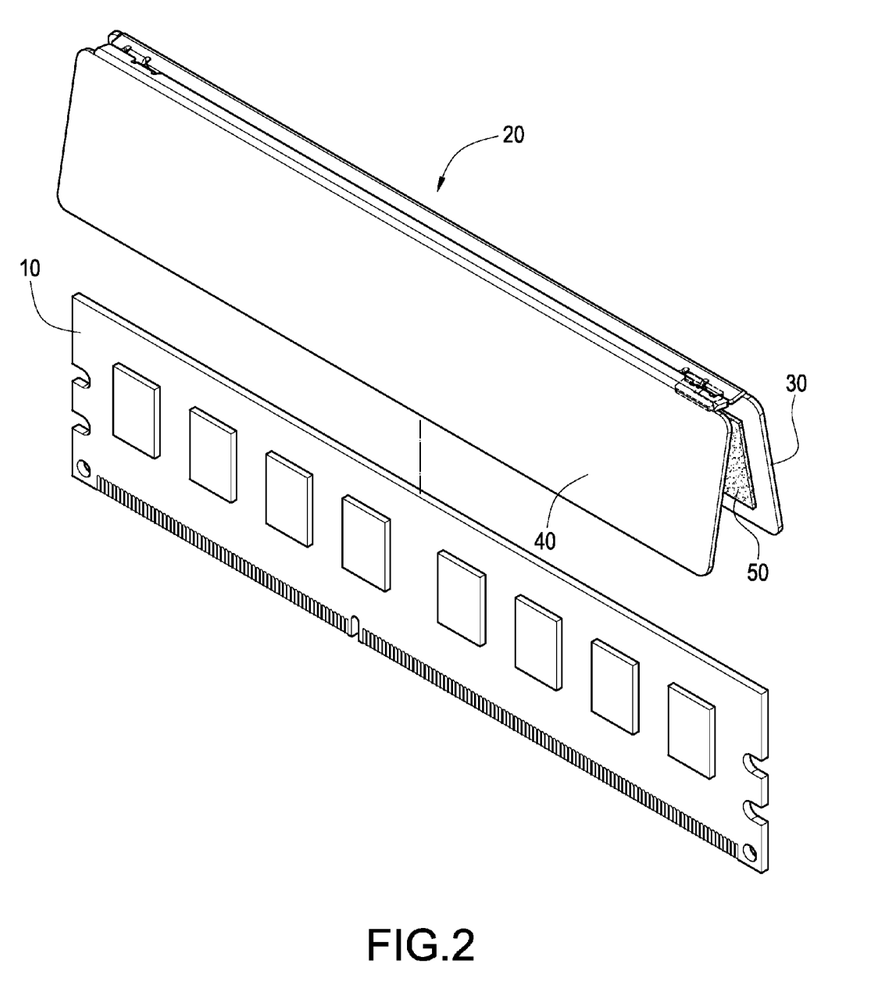
FIG. 2 is an exploded perspective view showing the heat-dissipating device of the present invention.
Figure 3:
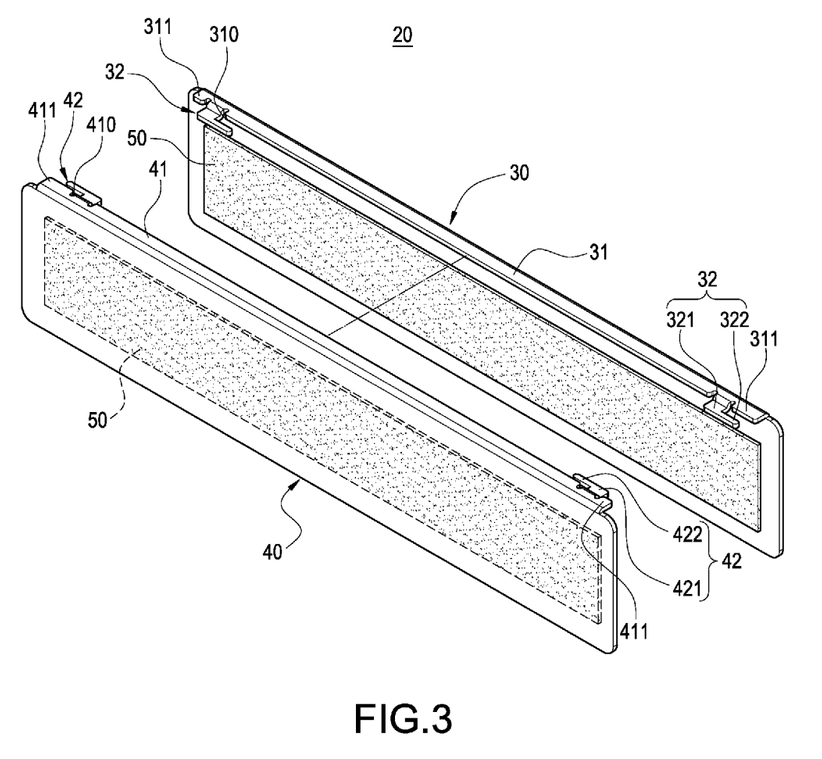
FIG. 3 is a perspective view showing the external appearance of the heat-dissipating assembly of the present invention.
Figure 4:
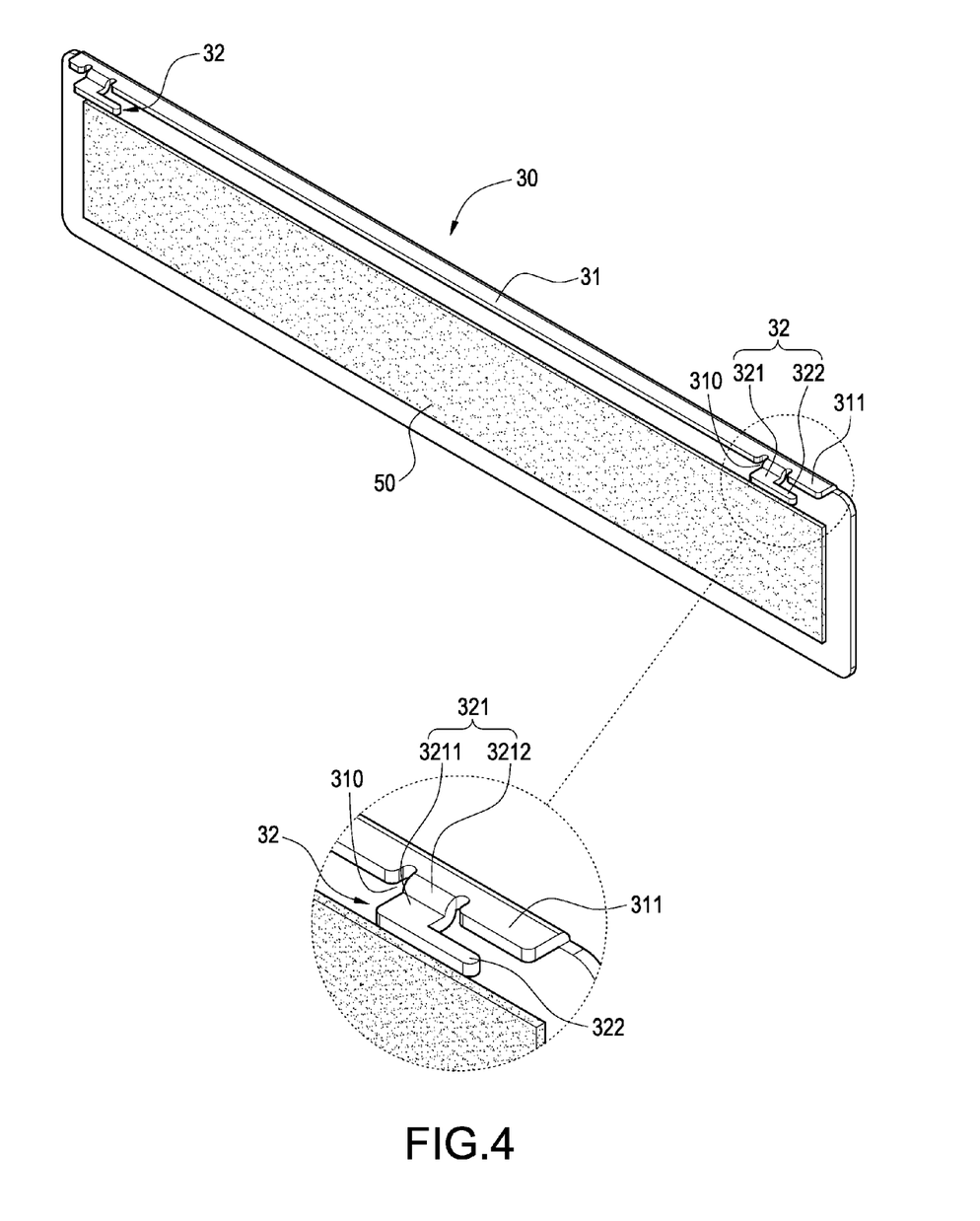
FIG. 4 is a perspective view showing the external appearance of a heat-dissipating body of the present invention.

Please refer to FIGS. 2 to 4. FIG. 2 is an exploded perspective view showing the heat-dissipating device of the present invention. FIG. 3 is a perspective view showing the external appearance of the heat-dissipating assembly of the present invention. FIG. 4 is a perspective view showing the external appearance of a heat-dissipating body of the present invention. The present invention provides a memory device 1, which comprises a memory 10 and a heat-dissipating assembly 20 configured for heat dissipation of the memory 10.

The heat-dissipating assembly 20 includes a first heat-dissipating body 30 and a second heat-dissipating body 40. The first heat-dissipating body 30 is adhered to one side of the memory 10. The bottom edge of the first heat-dissipating body 30 has a first supporting piece 31 bent toward the memory 10. The first supporting piece 31 has a pair of engaging pieces 32. Each of the engaging pieces 32 comprises a first stopping section 321 extending outwards from the first supporting piece 31 and a first insertion section 322 perpendicular to the first stopping section 321.

The second heat-dissipating body 40 is adhered to the other side of the memory 10 to correspond to the first heat-dissipating body 30. The bottom edge of the second heat-dissipating body 40 has a second supporting piece 41 bent toward the memory 10. The second supporting piece 41 has a pair of second engaging pieces 42. Each of the second engaging pieces 42 comprises a second stopping section 421 extending outwards from the second supporting piece 41 and a second insertion section 422 perpendicular to the second stopping section 421. The second insertion section 422 extends toward the first insertion section 322.

According to the above, the first supporting piece 31 is provided with a first notch 310 at an inner edge of the first stopping section 321. The second supporting piece 41 is provided with a second notch 410 at an inner edge of the second stopping section 421. The first supporting piece 31 is formed with a first retaining piece 311 at an outer edge of the first stopping section 321. The second supporting piece 31 is formed with a second retaining piece 411 at an outer edge of the second stopping section 421.

In the present embodiment, each of the first engaging piece 32 and the second engaging piece 42 is substantially formed into an L shape. In the first engaging piece 32, each of the first stopping section 321 and the second stopping section 421 is formed a stepped shape. The first stopping section 321 comprises a first bent surface 3211 and a first planar surface 3212 connected to the first bent surface 3211. The first insertion section 322 extends from one side of the first planar surface 3212. Similarly, the second engaging piece 42 has the same structure as that of the first engaging piece 32.

Further, the heat-dissipating assembly 20 also includes a heat-conducting medium 50. The heat-conducting medium 50 is made of a material having good thermal conductivity and viscosity such as a heat-conducting adhesive or heat-conducting glue. The heat-conducting medium 50 is applied on one surface of the first heat-dissipating body 30 facing the memory 10 and one surface of the second heat-dissipating body 40 facing the memory 10.

Figure 5:
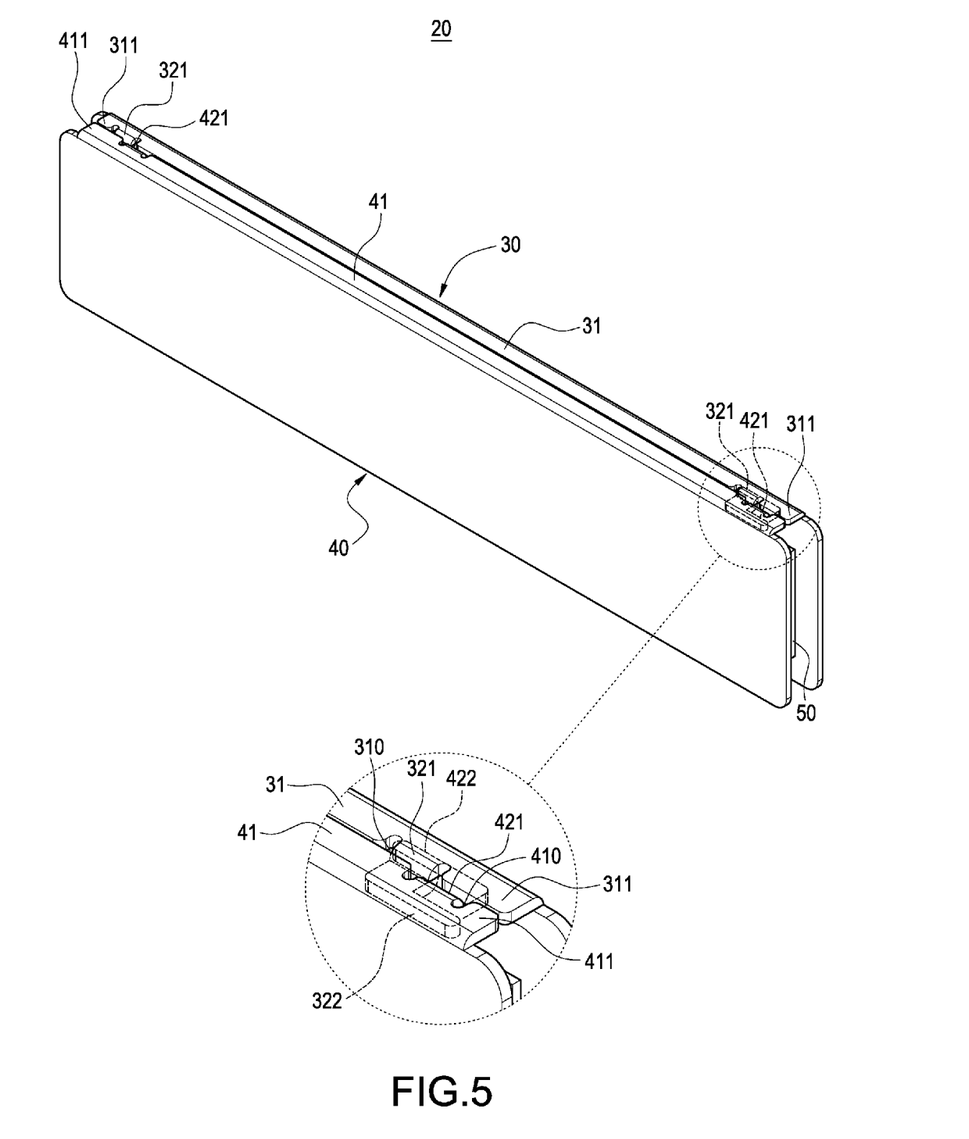
FIG. 5 is a perspective view showing the external appearance of the slidingly-engaged heat-dissipating assembly for a memory according to the present invention.
Figure 6:
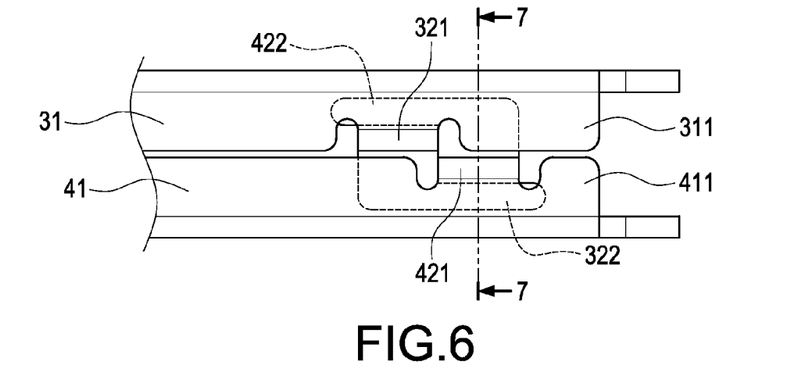
FIG. 6 is a partially assembled plan view showing the slidingly-engaged heat-dissipating assembly for a memory according to the present invention.
Figure 7:
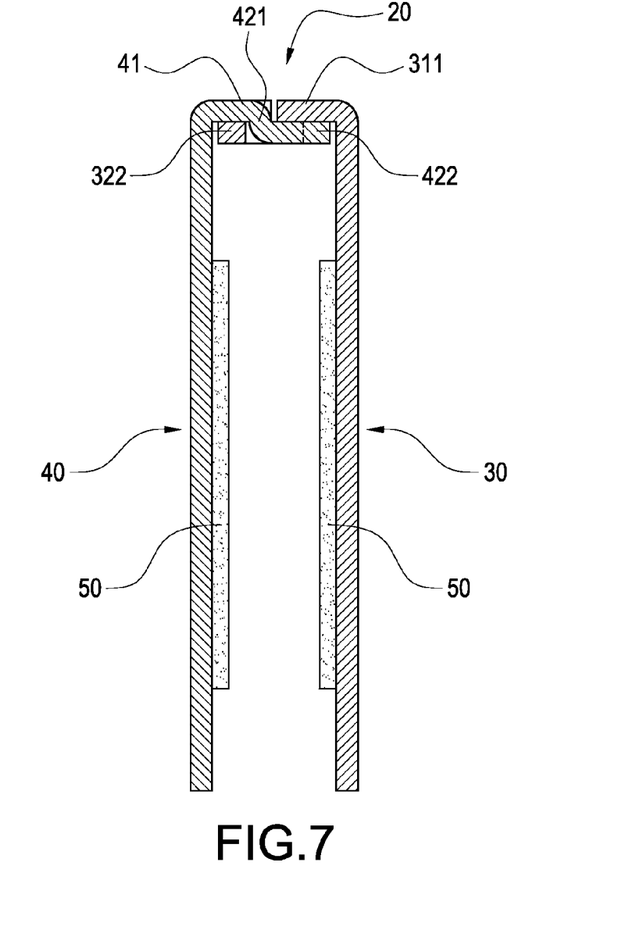
FIG. 7 is an assembled cross-sectional view showing the slidingly-engaged heat-dissipating assembly for a memory according to the present invention.

Please refer to FIGS. 5 to 7. FIG. 5 is a perspective view showing the external appearance of the slidingly-engaged heat-dissipating assembly for a memory according to the present invention. FIG. 6 is a partially assembled plan view showing the slidingly-engaged heat-dissipating assembly for a memory according to the present invention. FIG. 7 is an assembled cross-sectional view showing the slidingly-engaged heat-dissipating assembly for a memory according to the present invention. In order to assemble the heat-dissipating assembly 20, the first heat-dissipating body 30 is combined with the second heat-dissipating body 40 in such manner that the first engaging piece 32 and the second engaging piece 42 are aligned with each other in the front-and-back direction. The first insertion section 322 is slidingly disposed inside the second stopping section 421. Further, the second insertion section 422 is slidingly disposed inside the first stopping section 321. The first stopping section 321 abuts against the second stopping section 321, so that the first engaging piece 32 can be slidingly engaged with the second engaging piece 42. At this time, at one ends of the first heat-dissipating body 30 and the second heat-dissipating body 40, a portion of the first insertion section 322 is pressed by the second retaining piece 411, and a portion of the second insertion section 422 is pressed by the first supporting piece 31. Further, at the other ends of the first heat-dissipating body 30 and the second heat-dissipating body 40, a portion of the first insertion section 322 is pressed by the second supporting piece 41, and a portion of the second insertion section 422 is pressed by the first retaining piece 311. By this arrangement, when the first heat-dissipating body 30 and the second heat-dissipating body 40 spread outwards, the first engaging piece 32 can be still engaged with the second engaging piece 42 without separation from each other.

Figure 8:
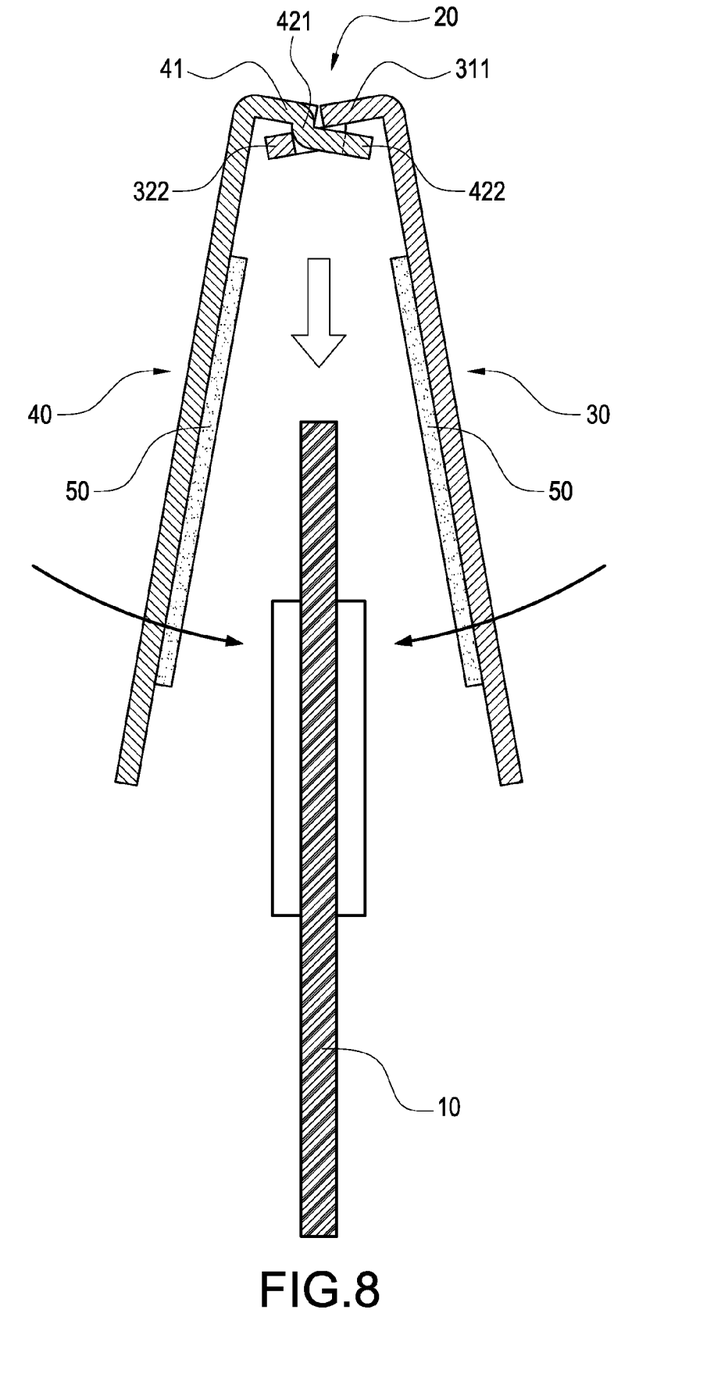
FIG. 8 is an assembled view showing the slidingly-engaged heat-dissipating assembly for a memory according to the present invention.
Figure 9:
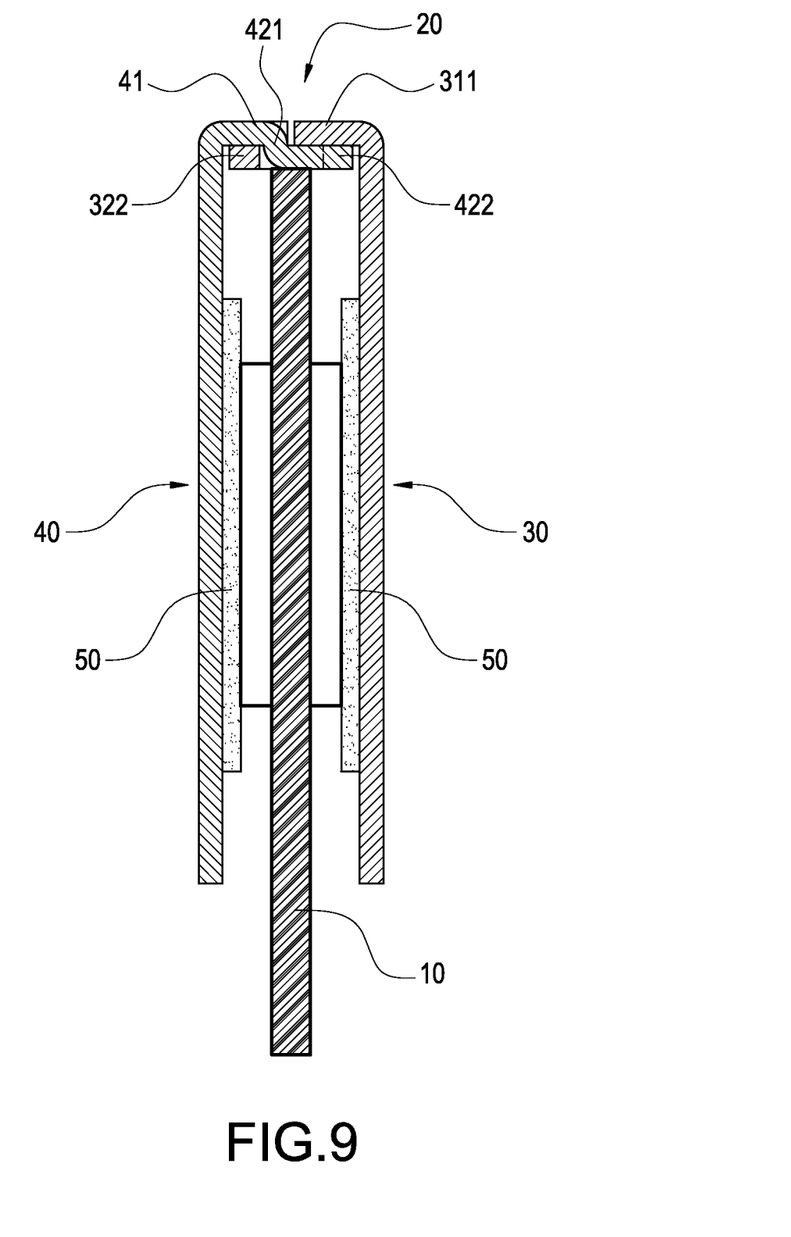
FIG. 9 is an assembled cross-sectional view showing the slidingly-engaged heat-dissipating assembly for a memory according to the present invention.

Please refer to FIGS. 8 and 9. FIG. 8 is an assembled view showing the slidingly-engaged heat-dissipating assembly for a memory according to the present invention, and FIG. 9 is an assembled cross-sectional view showing the slidingly-engaged heat-dissipating assembly for a memory according to the present invention. After the first heat-dissipating body 30 is slidingly engaged with the second heat-dissipating body 40, the first heat-dissipating body 30 and the second heat-dissipating body 40 spread outwards. Then, the memory 10 is disposed between the first heat-dissipating body 30 and the second heat-dissipating body 40. The heat-conducting medium 50 is applied on one surface of the first heat-dissipating body 30 facing the memory 10 and one surface of the second heat-dissipating body 40 facing the memory 10. With the above structure, the memory device 1 having a slidingly-engaged heat-dissipating assembly for a memory according to the present invention is obtained.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A slidingly-engaged heat-dissipating assembly for a memory, configured for heat dissipation of the memory, the heat-dissipating assembly including:
a first heat-dissipating body adhered to one side of the memory, a bottom edge of the first heat-dissipating body having a first supporting piece bent toward the memory, the first supporting piece having a pair of first engaging pieces, each of the first engaging pieces comprising a first stopping section extending outwards from the first supporting piece and a first insertion section perpendicular to the first stopping section; and
a second heat-dissipating body adhered to the other side of the memory to correspond to the first heat-dissipating body, a bottom edge of the second heat-dissipating body having a second supporting piece bent toward the memory, the second supporting piece having a pair of second engaging pieces, each of the second engaging pieces comprising a second stopping section extending outwards from the second supporting piece and a second insertion section perpendicular to the second stopping section, the second insertion section extending toward the first insertion section;
wherein the first insertion section is slidingly disposed inside the second stopping section, the second insertion is slidingly disposed inside the first stopping section, the first stopping section abuts against the second stopping section, so that the first engaging piece and the second engaging piece are slidingly engaged with each other.

2. The slidingly-engaged heat-dissipating assembly for a memory according to claim 1, wherein each of the first engaging piece and the second engaging piece is formed into an L shape.

3. The slidingly-engaged heat-dissipating assembly for a memory according to claim 2, wherein each of the first stopping section and the second stopping section is formed into a stepped shape, the first stopping section comprises a first bent surface and a first planar surface connected to the first bent surface, the first insertion section extends on one side of the first planar surface, the second stopping section comprises a second bent surface and a second planar surface connected to the second bent surface, and the second insertion section extends on one side of the second planar surface.

4. The slidingly-engaged heat-dissipating assembly for a memory according to claim 1, wherein the first supporting piece is provided with a first notch at an inner edge of the first stopping section, and the second supporting piece is provided with a second notch at an inner edge of the second stopping section.

5. The slidingly-engaged heat-dissipating assembly for a memory according to claim 4, wherein the first supporting piece is formed with a first retaining piece at an outer edge of the first stopping section, and the second supporting piece is formed with a second retaining piece at an outer edge of the second stopping section.

6. The slidingly-engaged heat-dissipating assembly for a memory according to claim 1, further including a heat-conducting medium, the heat-conducting medium being applied to one surface of the first heat-dissipating body facing the memory and one surface of the second heat-dissipating body facing the memory.

7. A memory device having a slidingly-engaged heat-dissipating assembly, including:
a memory;
a first heat-dissipating body adhered to one side of the memory, a bottom edge of the first heat-dissipating body having a first supporting piece bent toward the memory, the first supporting piece having a pair of first engaging pieces, each of the first engaging pieces comprising a first stopping section extending outwards from the first supporting piece and a first insertion section perpendicular to the first stopping section; and
a second heat-dissipating body adhered to the other side of the memory to correspond to the first heat-dissipating body, a bottom edge of the second heat-dissipating body having a second supporting piece bent toward the memory, the second supporting piece having a pair of second engaging pieces, each of the second engaging pieces comprising a second stopping section extending outwards from the second supporting piece and a second insertion section perpendicular to the second stopping section, the second insertion section extending toward the first insertion section;
wherein the first insertion section is slidingly disposed inside the second stopping section, the second insertion is slidingly disposed inside the first stopping section, the first stopping section abuts against the second stopping section, so that the first engaging piece and the second engaging piece are slidingly engaged with each other.

8. The memory device having a slidingly-engaged heat-dissipating assembly according to claim 7, wherein each of the first engaging piece and the second engaging piece is formed into an L shape, each of the first stopping section and the second stopping section is formed into a stepped shape, the first stopping section comprises a first bent surface and a first planar surface connected to the first bent surface, the first insertion section extends on one side of the first planar surface, the second stopping section comprises a second bent surface and a second planar surface connected to the second bent surface, and the second insertion section extends on one side of the second planar surface.

9. The memory device having a slidingly-engaged heat-dissipating assembly according to claim 7, wherein the first supporting piece is provided with a first notch at an inner edge of the first stopping section, the second supporting piece is provided with a second notch at an inner edge of the second stopping section, the first supporting piece is formed with a first retaining piece at an outer edge of the first stopping section, and the second supporting piece is formed with a second retaining piece at an outer edge of the second stopping section.

10. The memory device having a slidingly-engaged heat-dissipating assembly according to claim 7, further including a heat-conducting medium, the heat-conducting medium being applied to one surface of the first heat-dissipating body facing the memory and one surface of the second heat-dissipating body facing the memory.

* * * * *